(12) United States Patent
Shanbhogue et al.

(10) Patent No.: US 11,567,791 B2
(45) Date of Patent: Jan. 31, 2023

(54) TECHNOLOGY FOR MOVING DATA BETWEEN VIRTUAL MACHINES WITHOUT COPIES

(71) Applicant: Intel Corporation, Santa Clara, CA (US)

(72) Inventors: Vedvyas Shanbhogue, Austin, TX (US); Doddaballapur Jayasimha, Saratoga, CA (US); Raghu Ram Kondapalli, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 16/912,788

(22) Filed: Jun. 26, 2020

(65) Prior Publication Data
US 2021/0406056 A1  Dec. 30, 2021

(51) Int. Cl.
| | | |
|---|---|---|
| G06F 9/455 | (2018.01) | |
| G06F 9/46 | (2006.01) | |
| G06F 9/50 | (2006.01) | |
| G06F 12/0873 | (2016.01) | |
| G06F 12/1045 | (2016.01) | |

(52) U.S. Cl.
CPC ........ G06F 9/45558 (2013.01); G06F 9/5016 (2013.01); G06F 12/0873 (2013.01); G06F 12/1045 (2013.01); G06F 2009/4557 (2013.01); G06F 2009/45583 (2013.01); G06F 2009/45591 (2013.01); G06F 2009/45595 (2013.01)

(58) Field of Classification Search
CPC ............... G06F 9/45558; G06F 9/5016; G06F 12/0873; G06F 12/1045; G06F 2009/4557; G06F 2009/45583; G06F 2009/45591; G06F 2009/45595
USPC .......................................................... 718/1
See application file for complete search history.

(56) References Cited

U.S. PATENT DOCUMENTS 9,459,903 B2 * 10/2016 Gray ....................... H04L 49/70
10,255,203 B2 * 4/2019 Elzur .................... G06F 12/145
(Continued)

FOREIGN PATENT DOCUMENTS

WO    WO-2013186694 A2 * 12/2013 .......... G06F 12/0811

OTHER PUBLICATIONS

Kim Hyoseung et al., Real-Time Cache Management for Multi-Core Virtualization, 2016 International Conference an Embedded Software (EMSOFT), ACM, Oct. 2, 2016 (10 pages).

(Continued)

*Primary Examiner* — Bradley A Teets
(74) *Attorney, Agent, or Firm* — Trop, Pruner & Hu, P.C.

(57) ABSTRACT

A processor comprises a core, a cache, and a ZCM manager in communication with the core and the cache. In response to an access request from a first software component, wherein the access request involves a memory address within a cache line, the ZCM manager is to (a) compare an OTAG associated with the memory address against a first ITAG for the first software component, (b) if the OTAG matches the first ITAG, complete the access request, and (c) if the OTAG does not match the first ITAG, abort the access request. Also, in response to a send request from the first software component, the ZCM manager is to change the OTAG associated with the memory address to match a second ITAG for a second software component. Other embodiments are described and claimed.

21 Claims, 8 Drawing Sheets

(56) References Cited

U.S. PATENT DOCUMENTS

| | | | |
|---|---|---|---|
| 10,706,147 B1* | 7/2020 | Pohlack | G06F 12/0811 |
| 2006/0265554 A1* | 11/2006 | Carter | G06F 12/0822 |
| | | | 711/144 |
| 2009/0327616 A1* | 12/2009 | Conway | G06F 12/082 |
| | | | 711/146 |
| 2010/0281273 A1 | 11/2010 | Lee et al. | |
| 2015/0248357 A1 | 9/2015 | Kaplan et al. | |
| 2018/0004680 A1* | 1/2018 | Elzur | G06F 12/145 |
| 2021/0099391 A1* | 4/2021 | Masputra | H04L 47/2433 |

OTHER PUBLICATIONS

Vladimir Kiriansky et al., DAWG: A Defence Against Cache Timing Attacks in Speculative Execution Processors, 2018 51st Annual IEEE/ACM International Symposium on Microarchitecture (MICRO), IEEE, Oct. 20, 2018 (14 pages).

European Patent Office, Extended European Search Report for Appl. No 20210591.2 dated May 18, 2021 (14 pages).

VMWARE, INC., "Performance Evaluation of Intel EPT Hardware Assist," Revision: Mar. 30, 2009; Item: EN-000194-00, 14 pages total.

\* cited by examiner

TECHNOLOGY FOR MOVING DATA BETWEEN VIRTUAL MACHINES WITHOUT COPIES

TECHNICAL FIELD

The present disclosure pertains in general to data processing systems and in particular to technology for moving data between components such as virtual machines (VMs) without copying that data.

BACKGROUND

A data processing system may execute a virtual machine monitor (VMM) that enables multiple different virtual machines (VMs) to execute on the data processing system. And sometimes, one VM will send data to another VM. One way to send data from one VM to another is to transfer the data using a network packet. Another way is to use shared memory that is accessible to both VMs.

To use a network packet, the source VM may copy the data from working storage of the source VM into the packet and then send to packet to the destination VM. The destination VM may then copy the data from the packet into working storage of the destination VM, and an application in the destination VM may then use that data.

To use shared memory, the source VM may copy the data from its working storage into a shared memory buffer. The destination VM may then copy the data from the shared memory buffer into its working storage. However, a shared memory channel may present security risks, in that data may be inadvertently leaked between the two VMs via that channel.

Another approach is for the destination VM to instruct the VMM to map a memory buffer for the destination VM to a portion of the working storage of the source VM. The source VM may then copy data into that memory buffer from working storage of the source VM. The destination VM may then instruct the VMM to unmap that buffer from the source VM, and the destination VM may copy data from that memory buffer into the working storage of the destination VM. This approach requires the destination VM to perform one memory copy and two VMM calls. It also requires a translation lookaside buffer (TLB) invalidation to unmap the buffer from the source VM. And since the VMM cannot determine which linear address of the source VM would map to the buffer, the TLB invalidation would have to flush all TLB translations of the source VM. Such invalidations are expensive and may adversely affect performance.

In any case, the need to make copies of the data may adversely affect performance.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
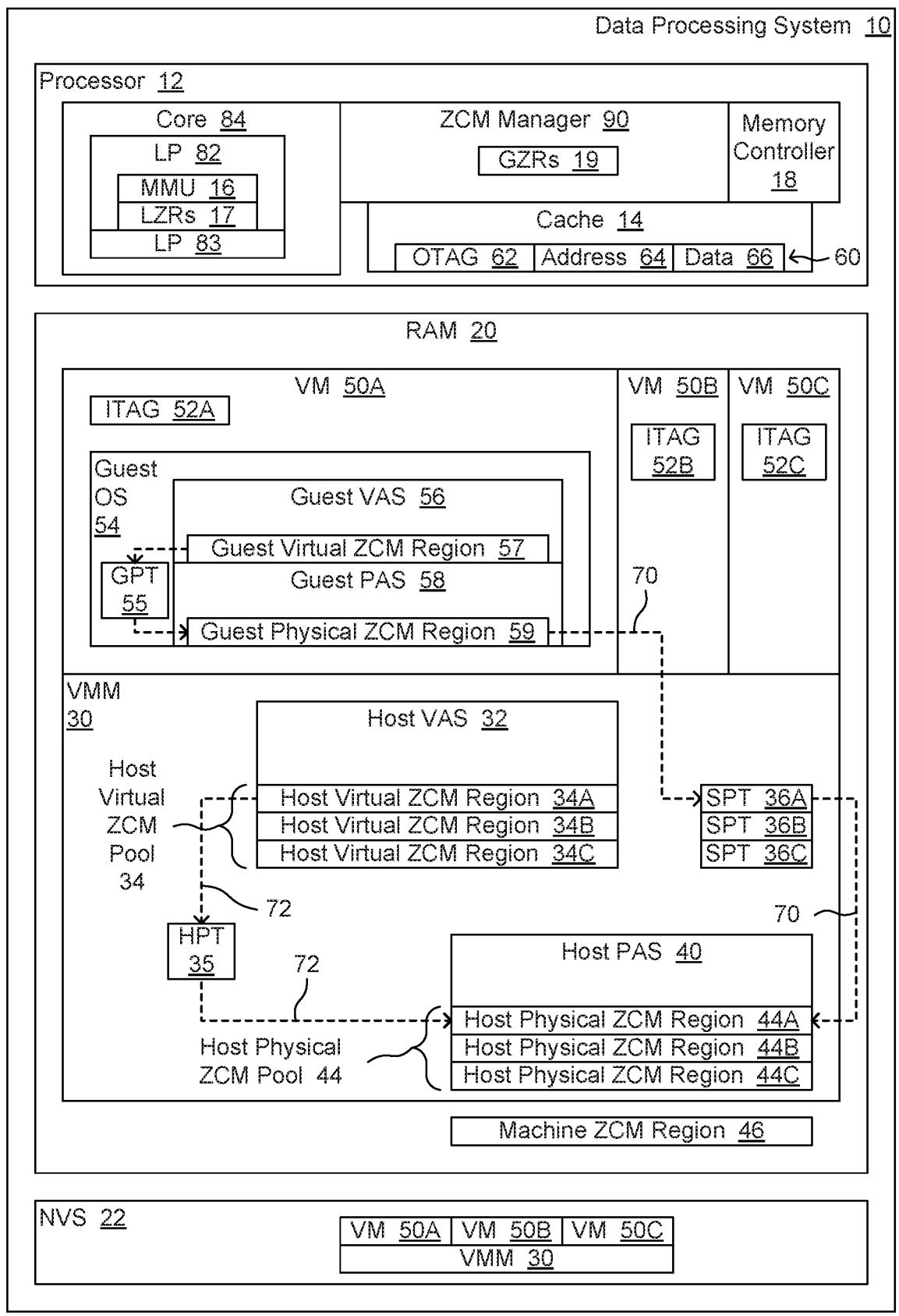
FIG. 1 is a block diagram of an example embodiment of a data processing system with technology for moving data between VMs without copying that data.

The present disclosure describes technology for moving data between components of a data processing system without copying the data. The present disclosure describes one or more example embodiments in which those components are VMs. However, in other embodiments, other types of components may use the technology described herein to move data without copying the data. For instance, in another embodiment, the present teachings may be used to move data between processes.

In one embodiment, the technology described herein allows data movement between VMs without needing any memory copies, and without needing any shared memory buffers to be established between the VMs. Furthermore, this technology does not need VMM calls as part of in the data movement operations. This technology also provides security isolation to prevent the source VM (or any other VM, other than the destination VM) from accessing the data once that has been moved to the destination VM.

As described in greater detail below, in one embodiment, a data processing system includes first and second VMs, as well as a VMM to manage the VMs. The first VM may save data in a particular region of memory, and the data processing system may then perform certain operations to make that data to available to a second VM without copying the data. Those operations may be referred to as "zero-copy memory" (ZCM) operations. Likewise, a region of memory that can be used to move data between VMs without copying the data may be referred to as a "ZCM region," a collection of ZCM regions may be referred to as a "ZCM pool," registers to store data for managing ZCM operations may be referred to as "ZCM registers," etc.

To enable the VMs to perform ZCM operations, the VMM may define a portion of the host physical address space (PAS) of the data processing system as a ZCM pool. Also, the memory subsystem associates with an ownership tag (OTAG) with each cache line from the ZCM pool. The OTAG for a cache line identifies a single entity or component (e.g., a particular VM) as the current owner for that cache line. Portions of the ZCM pool are accessible to the VMs, which can use the ZCM pool to move data between VMs in a confidential manner without copying that data. Also, the VMM assigns a different identity tag (ITAG) to each VM. Every access to a cache line from a VM carries the ITAG of that VM. The ITAG identifies the VM that is attempting to access a cache line. In general, when a VM attempts to access a cache line, if the ITAG matches the OTAG, the access is allowed; and if it does not, the access is denied.

For purposes of this disclosure, the term "cache" refers high-speed storage that resides (from a functional or electrical perspective) between RAM and execution units in processor. For instance, a processor may include multiple levels of cache, including an "L1" cache closest to the execution units and an LLC closest to the RAM. For instance, the execution units in a processor may be organized into one or more physical cores, each of which contains two or more logical processors (LPs); and the processor may include an L1 cache for each LP and an LLC that is shared by all of the physical cores. Unless a more specific meaning is clearly indicated by the context, the term "cache" refers collectively to the cache storage circuitry for holding the cached data and the control logic for managing that cache storage circuitry. That control logic may include snoop filters, for instance. Also, terms like "memory subsystem" and "memory hierarchy" refer collectively to the cache, the RAM, and any other control logic for managing the cache and the RAM, such as memory management units (MMUs) and a memory controller.

As described in greater detail below, data processing system 10 uses page tables to reference different pages of memory, according to a particular page size. For instance, data processing system 10 may use a page size of 4 kilobytes (KB). However, the memory subsystem may use smaller subdivisions when moving data from RAM to cache. For purposes of this disclosure, the term "cache line" refers to the unit of data transfer for moving data from RAM to cache. For instance, a data processing system may use a cache line size of 64 bytes. And if the cache in such a system has a size of 64 KB, the cache can hold 1024 cache lines. However, in other embodiments, data processing systems may use larger or smaller page sizes, larger or smaller cache line sizes, etc.

FIG. 1 is a block diagram of an example embodiment of a data processing system 10 with technology for moving data between VMs without copying that data. Data processing system 10 is a hypothetical system, with various hypothetical components and features to illustrate the technology introduced herein. In particular, data processing system 10 includes a semiconductor package with at least one die containing circuitry to implement a central processing unit (CPU) 12. CPU 12 may also be referred to as processor 12. Processor 12 includes various processing resources, such as one or more cores 84, each of which may contain one or more arithmetic logic units (ALUs), various registers, etc. Data processing system 10 also includes other components coupled to processor 12, such as non-volatile storage (NVS) 22 and random access memory (RAM) 20.

NVS 22 includes instructions which may be copied into RAM 20 and executed by processor 12. Such instructions may also be referred to as "software." In the example of FIG. 1, the software in NVS 22 includes a VMM 30 and various VMs 50A-50C. Data processing system 10 may copy VMM 30 from NVS 22 into RAM 20, and processor 12 may then execute VMM 30. VMM 30 may then instantiate VMs 50A-50C in RAM 20, based on the respective images of VMs 50A-50C in NVS 22. Thus, the software in NVS 22 may implement VMM 30 and VMs 50A-50C. FIG. 1 illustrates copies of the images for VMM 30 and VMs 50A-50C in RAM 20 to indicate that data processing system 10 executes VMM 30 and VMs 50A-50C from RAM 20.

Also, VMM 30 assigns a different ITAG to each VM. Accordingly, for purposes of illustration, FIG. 1 shows ITAGs 52A, 52B, and 52C in VMs 50A, 50B, and 50C, respectively. However, VMM 30 may actually store the ITAGs outside of the VMs, such as in an LZR and/or a GZR.

Each VM may include a guest OS and other software. For instance, VM 50A may include a guest OS 54 which provides for a guest PAS 58 and a corresponding guest virtual address space (VAS) 56. Guest VAS 56 exists and operates at a high level of abstraction, relative to the hardware (e.g., the memory modules) of RAM 20. Guest PAS 58 exists and operates at a lower level of abstraction.

Guest OS 54 may use a guest page table (GPT) 55 to translate guest virtual addresses to guest physical addresses.

RAM 20 may consist of one or more memory modules. For purposes of this disclosure, the circuitry within RAM 20 for storing data may be referred to as "machine memory." Also, as described in greater detail below, data processing system 10 uses a portion of the machine memory as a ZCM region. That portion may be referred to as the "machine ZCM region." In particular, the machine ZCM region is a region of machine memory that can be used by VMs to move data to other VMs without copying that data.

CLSND

Processor 12 supports an instruction which enables a source VM to send data in a cache line to a destination VM by changing the OTAG of the cache line to the ITAG of the destination VM. That instruction may be referred to as a "cache line send" (CLSND) instruction or a "send request." VMs may execute CLSND instructions without calling the VMM. The CLSND instruction first verifies that the specified cache line address is owned by the source VM by comparing the ITAG of the source VM to the OTAG of the cache line. On a tag match, the OTAG field of the cache line is updated to the ITAG of the destination VM. However, if the tags don't match, then the change is aborted. An error may be signaled to the source VM, and appropriate action may be taken.

Once the source VM has successfully executes the CLSND, the source VM no longer has access to the cache line data, since its OTAG no longer matches that VM's ITAG. The data is then accessible to the destination VM. The only change required is an update in the OTAG field of the cache line. The data line itself does not move and stays in place. Thus, there is no need for any data copying.

General Architecture

For ease of understanding, FIG. 1 illustrates a single core 84 with two LPs 82-83 to support simultaneous multithreading (SMT). However, in some embodiments, a processor may include multiple cores, and each core may provide for multiple LPs. Alternatively, a processor may include one or more processing cores with no LPs. In other words, a processor may include one or more single-threaded processing cores. A data processing system may even include multiple processors. Each LP (or each processor or core without LPs) may include its own memory MMU, its own set of local ZCM registers, etc. Thus, FIG. 1 shows an MMU 16 and a set of local ZCM registers (LZRs) 17 in LP 82. LP 83 may include the same kinds of components as LP 82. Similarly, Figure illustrates a single cache 14, but cache 14 represents multiple levels of cache.

The LZRs in an LP (or in a core without LPs) may include the following:
- a "VM-ITAG register," to hold the ITAG for the VM that is currently running on that LP; and
- a "DEST-ITAGS register," to hold ITAGs for any other VMs that are authorized to receive data from the current VM. In other words, the ITAGs in the DEST-ITAGS register identify the authorized destination VMs for data from the current VM.

In one embodiment, one or more of the LZRs could reside in an intra-die interconnect (IDI) bridge that connects a physical core in processor 12 to other parts of processor 12. In another embodiment, one or more of the LZRs could be reside in a caching home agent or in another functional unit in the processor.

Processor 12 also includes other components which the LPs share, such as a memory controller 18 and global ZCM registers (GZRs) 19 to hold global ZCM settings. The GZRs may include the following:
- a "ZCM range register" for defining the machine ZCM region;
- a "ZCM remap register" for remapping host physical addresses to the machine ZCM region;
- a "ZCM base register" to specify the beginning of the ZCM pool; and
- a "ZCM mask register" to specify a mask for converting a host physical address to a machine memory address; and
- a "ZCM slice hash mask" for identifying bits of a physical address to be disregarded when computing a slice index for a cache slice.

In FIG. 1, the region of machine memory designated by the ZCM range register is illustrated as machine ZCM region 46. In one scenario, VMM 30 uses the ZCM range register to designate or reserve a 1-megabyte (MB) region of machine memory to serve as machine ZCM region 46. However, in other examples, a machine ZCM region may be larger or smaller. In one embodiment, VMM 30 stores size and location values in the ZCM range register, to specify a size and a beginning address or location for machine ZCM region 46.

VMM 30 provides for a host VAS 32 that supports multiple guest PASs. A portion of the host VAS corresponds to each guest PAS for each VM. VMM 30 includes a supplemental page table (SPT) for each VM, to provide for second-level address translation. An SPT may be implemented as an extended page table (EPT), for instance. In the example of FIG. 1, VMM 30 uses SPT 36A to translate guest physical addresses (GPAs) from VM 50 to host physical addresses (HPAs), as illustrated by dashed lines 70. Likewise, VMM 30 uses SPTs 36B and 36C to translate addresses for VMs 50B and 50C, respectively. Host VAS 32 operates at a lower level of abstraction than guest PAS 58.

VMM 30 also includes a host page table (HPT) 35 to map HPAs into host VAS 32. For instance, VMM 30 may directly map a host physical ZCM region 44A to a host virtual ZCM region 34A, as illustrated by dashed lines 72.

As indicated above, processor 12 includes a memory controller 18 and at least one MMU 16 which cooperate to provide for a host PAS 40. When VMM 30 schedules a VM to execute on processor 12 (e.g., when VMM 30 schedules VM 50 on LP 82), MMU 16 uses the SPT for that VM (e.g., SPT 36A) to perform translations from the GPAs used by that VM (e.g., from Guest PAS 58) to HPAs within host PAS 40. Memory controller 18 then accesses RAM 20 based on those HPAs.

Host PAS 40 operates at a lower level of abstraction than host VAS 32. However, host PAS 40 still operates at a higher level of abstraction than the hardware of RAM 20.

Processor 12 includes a control logic (e.g., circuitry) which enables processor 12 to perform ZCM operations. That control logic may be referred to in general as a "ZCM manager" 90, and those operations include managing a machine ZCM region, selectively mapping a particular host physical ZCM region to that machine ZCM region, restricting access to the machines ZCM region, etc. Thus, the operations performed by ZCM manager 90 include managing host physical ZCM pool 44 and machine ZCM region 46. For ease of reference, FIG. 1 shows ZCM manager 90 within processor 12, along with components such as core 84, memory controller 18, and cache 14. However, portions of the control logic for ZCM manager 90 may reside in other components, such as memory controller 18 and MMU 16. ZCM manager 90 includes control logic that is coupled to core 84 and control logic that is that is coupled to cache 14. Portions of the control logic for ZCM manager 90 enable processor 12 to execute various ZCM instructions (e.g., the CLSND instruction).

VMM 30 may use ZCM manager 90 to allocate a host physical ZCM pool 44 within host PAS 40. In particular, VMM 30 allocates one host physical ZCM region within ZCM pool 44 for each VM. Thus, FIG. 1 depicts host physical ZCM regions 44A, 44B, and 44C in host physical ZCM pool 44, corresponding respectively to VMs 50A, 50B, and 50C.

The size of each host physical ZCM region may be the same as the size of machine ZCM region 46. Consequently, if there are X VMs, the size of host physical ZCM pool 44 may be X times the size of machine ZCM region 46. For instance, in one example, host physical ZCM pool 44 runs from the HPA of 0xAB50_0000 to the HPA of 0xAB7F_FFFF, with each host physical ZCM region occupying 1 MB within that pool. For instance, host physical ZCM pool 44 may include the host physical ZCM regions with the address ranges described below.
- host physical ZCM region 44A: 0xAB50_0000 through 0xAB5F_FFFF
- host physical ZCM region 44B: 0xAB60_0000 through 0xAB6F_FFFF
- host physical ZCM region 44C: 0xAB70_0000 through 0xAB7F_FFFF Also, as indicated above, VMM 30 may define machine ZCM region 46. ZCM manager 90 may then selectively map machine ZCM region 46 to a particular one of the host physical ZCM regions. In other words, memory controller 18 may treat each host physical ZCM region as an alias to machine ZCM region 46. However, as described in greater detail below, memory controller 18 allows access via only one alias at a time, and memory controller 18 prevents access by any VM that is not the current owner of machine ZCM region 46, or of a portion of ZCM region 46, such as a cache line.

VMM 30 may also allocate, within host VAS 32, a host virtual ZCM pool 34 that corresponds to host physical ZCM pool 44. For instance, host virtual ZCM pool 34 may include host virtual ZCM regions 34A, 34B, and 34C, which correspond respectively to host physical ZCM regions 44A, 44B, and 44C.

Also, each VM includes a guest virtual ZCM region, and a corresponding guest physical ZCM region, such as guest virtual ZCM region 57 and guest physical ZCM region 59 for VM 50A. In addition, as indicated above, the SPT for each VM maps that VM's guest physical regions to corresponding host physical regions.

Furthermore, as described in greater detail below, each VM may use its guest virtual ZCM region to transfer data to another VM without copying that data. As part of that process, memory controller 18 may treat each host physical ZCM region as an alias to machine ZCM region 46. For instance, a first VM may obtain control of a cache line within machine ZCM region 46, and that VM may then store data in that cache line. The first VM may then transfer control or ownership of that cache line within machine ZCM region 46 to a second VM. The second VM may then access the data that was stored in that cache line by the first VM.

Processor 12 may also include one or more levels of cache memory, depicted collectively in FIG. 1 as cache 14. Cache 14 may be organized into cache lines, such as cache line 60. Each cache line may include data 66 that was read from RAM 20 (or that is to be stored in RAM 20), along with the host physical (or host virtual) address 64 for that data. In one example, each cache line contains 128 bytes of data, but cache lines may be larger or smaller in other examples.

In addition to data and an address, each cache line also includes an OTAG (e.g., OTAG 62) to identify the VM which owns that cache line. And the entire memory hierarchy (e.g., the core caches, the snoop filters, the LLC, the memory controllers, etc.) maintains the OTAG associated with a cache line. Furthermore, as described in greater detail below, a VM may transfer ownership of one or more cache lines in machine ZCM region 46 to another VM.

Whenever memory controller 18 reads from machine ZCM region 46 on behalf of a VM, memory controller 18 verifies that the ITAG from that VM matches the current OTAG for machine ZCM region 46, to verify that that VM is the current owner. If the VM that is trying to read machine ZCM region 46 is not the current owner, memory controller 18 aborts the read.

When VMM 30 schedules a VM on an LP (e.g. as part of a context switch), VMM 30 updates registers on that LP with data pertaining to that VM. Those registers include the LZRs, and that data includes the ITAG for that VM. For instance, as indicated above, when VMM 30 schedules a VM on an LP, VMM 30 also stores the ITAG for that VM in the VM-ITAG register for that LP. In addition, VMM 30 updates the DEST-ITAGS register with data to identify any other VMs that are authorized to receive data from the current VM. In other words, that data in that register identifies the valid destination VMs for data from the current VM.

Similarly, in an embodiment involving single-threaded cores, when the VMM schedules a VM on one of those cores, the VMM updates registers on that core with data pertaining to that VM.

Figure 2:
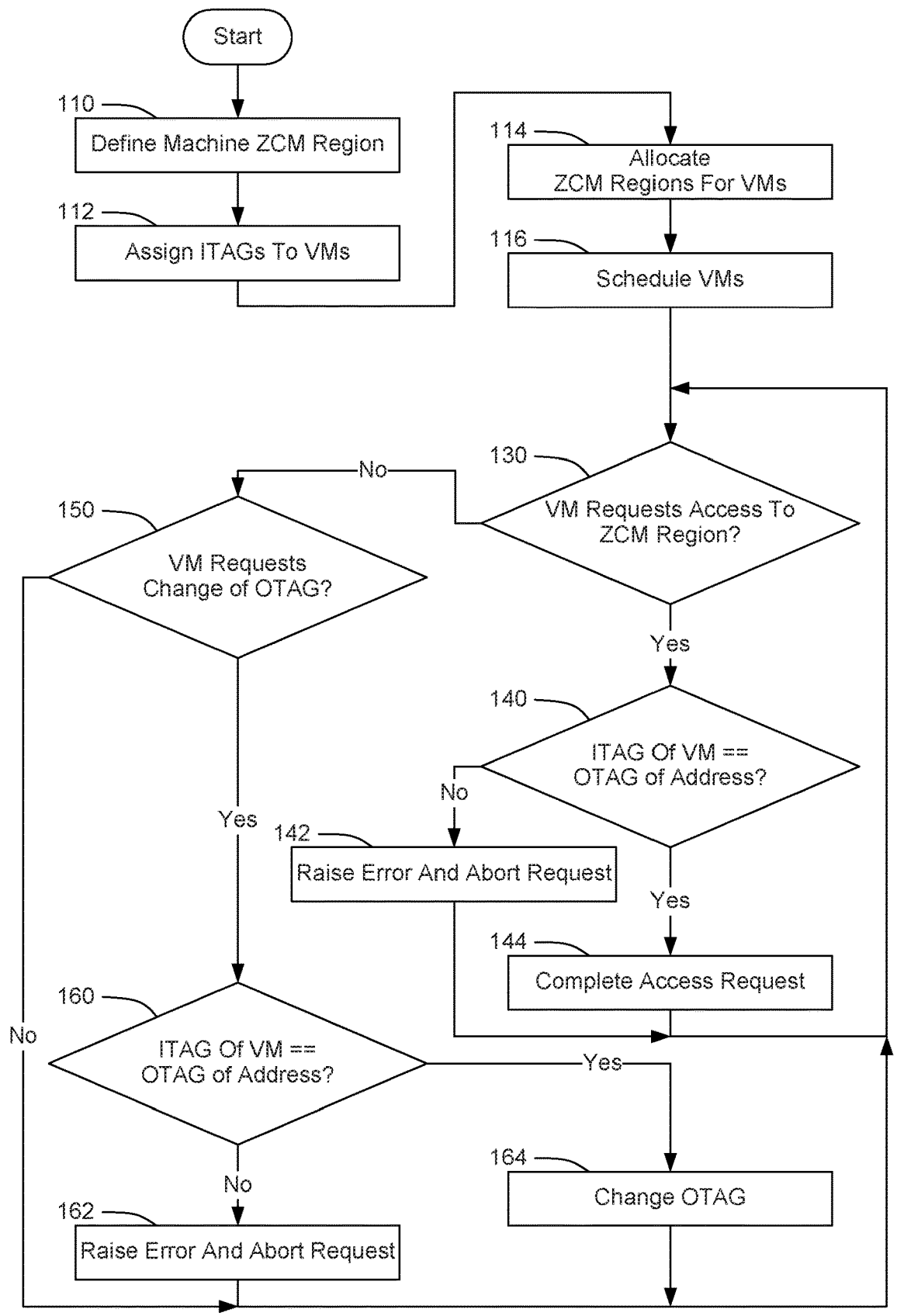
FIG. 2 is a flowchart of an example embodiment of a process for moving data between VMs without copying that data, in response to a send request.

FIG. 2 is flowchart of an example embodiment of a method for sharing data between VMs. That method is described on the context of an example scenario involving data processing system 10. As shown at block 110, the process may start with VMM 30 using the ZCM range register to define machine ZCM region 46. As shown at block 112, VMM 30 may then assign a different ITAG to each of VMs 50A, 50B, and 50C. For instance, VMM 30 may assign ITAG 52A to VM 50A.

As shown at block 114, VMM 30 may then allocate a ZCM region for each VM. For instance, VMM 30 may allocate guest physical ZCM region 59 for VM 50A, backed by host physical ZCM region 44A, along with additional guest physical ZCM regions for VMs 50B and 50C, backed respectively by host physical ZCM regions 44B and 44C. Accordingly, SPTs 36A-36C may map those guest physical ZCM regions to the corresponding host physical ZCM regions. Furthermore, ZCM manager 90 associates an OTAG with each host physical ZCM region, to indicate which VM owns that region. For instance, in one scenario, the OTAG for host physical ZCM region 44A matches the ITAG 52A for VM 50A, and the OTAGs for the other regions match the ITAGs for the other VMs, respectively. In addition, processor 12 keeps track of the OTAG associate with each cache line whenever a cache line is loaded from RAM 20 into cache 14 or written back to RAM 20 from cache 14. Furthermore, as described in greater detail below, memory controller 18 allows a VM to access (i.e., read or write) a cache line only if the OTAG for that cache line matches the ITAG for that VM.

As shown at block 116, VMM 30 may then finish instantiation of each VM by scheduling the VM to run on processor 12. In one scenario, VMM 30 schedules VMs 50A and 50B to run on LPs 82 and 83. Processor 12 may include additional LPs (not illustrated), and VMM 30 may schedule VM 50C to run on one of those LPs. Each VM may then run on its assigned LP. Alternatively, in an embodiment with single-threaded cores, the VMM may schedule VMs to run on those single-threaded cores. Also, if there are insufficient LPs or cores, one or more VMs may take turns running on an LP or a core.

However, as part of the scheduling process, VMM 30 loads the ITAG for each VM into the VM-ITAG register of that VM's LZRs, and VMM 30 loads the ITAGs for the valid destination VMs for each VM into the DEST-ITAGS register of that VM's LZRs. For instance, in one scenario, VM 50 has been configured to allow VMs 50B and 50C as valid destination VMs. Consequently, VMM 30 updates the VM-ITAG register in LZRs 17 with ITAG 52A, and VMM 30 updates the DEST-ITAGS register in LZRs 17 with the ITAGs for VMs 50B and 50C.

As shown at block 130, memory controller 18 may then determine whether a VM has requested access to a ZCM region. In one scenario, VM 50A is executing an instruction to read from an address within guest physical ZCM region 59. Consequently, memory controller 18 determines that VM 50A is requesting access to a ZCM region. Consequently, as shown at block 140, memory controller 18 determines whether the ITAG of the VM matches the OTAG of the requested address. If the ITAG and OTAG do not match, memory controller raises an error and aborts the request, as shown at block 142. But if they do match, memory controller completes the request, as shown at block 144. The process may then return to block 130.

However, if a VM is not requesting access to a ZCM region, ZCM manager may determine whether a VM is requesting a change to an OTAG, as shown at block 150. In particular, ZCM manager 90 enables processor 12 to support an instruction which enables a first VM to change the OTAG of a cache line (or multiple cache lines) which corresponds to that VM's host physical ZCM region, to designate a second VM as the owner of that cache line (or those cache lines). As indicated above, that instruction may be referred to as a CLSND instruction. As described in greater detail below, after the first VM executes the CLSND instruction, the second VM may then access that cache line, because the OTAG of that cache line will match the ITAG of the second VM.

As shown at block 160, if a VM is requesting a change to an OTAG, ZCM manager 90 may determine whether the ITAG of that VM matches the current OTAG of that address or cache line. In other words, ZCM manager 90 determines whether the requesting VM is the current owner of that address. If the requesting VM is not the current owner, ZCM manager 90 raises an error and aborts the request, as shown at block 162. However, if the requesting VM is the current owner, ZCM manager changes the OTAG for that cache line according to the request, as shown at block 164. In a data processing system with multiple levels of cache, the ZCM manager may also demote the cache line to the LLC. Consequently, when the new owner accesses the cache line, no snoops are needed to the old owner's core caches for that cache line.

As indicated above, the DEST-ITAGS register holds ITAGs for VMs that are authorized to receive data from the current VM. For each VM, VMM 30 may populate that VM's DEST-ITAGS register with ITAGs for any authorized destination VMs.

Also, in one embodiment, for a current VM to change the OTAG of a cache line from the ITAG of the current VM to the ITAG of a particular destination VM, the current VM uses the DEST-ITAGS register (in conjunction with the CLSND instruction) to specify the new ITAG. In other words, the current VM uses the DEST-ITAGS register to specify the ITAG of the destination VM. For instance, the current VM may specify the ITAG of the destination VM by providing an index into the DEST-ITAGS register to index the entry that contains the ITAG for the desired destination VM.

The process of FIG. 2 may then return to block 130, with each VM continuing to run on its LP, and with ZCM manager performing ZCM operations as necessary.

However, as indicated above, in other embodiments, a data processing system may include a processor that includes single-threaded cores, and the VMs may run on those cores.

Referring again to block 110 of FIG. 2, as indicated above, VMM 30 may use the ZCM range register to define machine ZCM region 46. And as shown at block 114, VMM 30 may allocate a ZCM region for each VM. In one embodiment, those ZCM regions constitute host physical ZCM pool 44. VMM 30 may also set GZRs to link the ZCM regions in host physical ZCM pool 44 to machine ZCM region 16. For instance, VMM 30 may store a value in the ZCM base register to specify the beginning of host physical ZCM pool 44, and VMM 30 may store a value in the ZCM mask register to specify a mask for converting a host physical address to a machine memory address.

In one embodiment, VMM 30 and ZCM manager 90 (e.g., including components such as MMU 16 and memory controller 18) use a set of bits of the HPA as the OTAG. For instance, to enable four VMs to utilize ZCM operations, VMM 30 may use two bits to encode four different values to be used as ITAGs and OTAGs. Accordingly, VMM 30 may use two bits from each address within host physical ZCM pool 44 as the OTAG for that address. VMM 30 and ZCM manager 90 may also use another set of bits of the HPA as a ZCM pool prefix. And they may use a third set of bits as physical addressing bits (PABs). Each physical address may also have a maximum number of bits, and that number may be represented as "Max_PA." For instance, in one embodiment, Max_PA is 32. Also, in that embodiment, VMM 30 and ZCM manager 90 support four different OTAGs for four VMs within a physical address by using a 2-bit OTAG at bits 21:20, a 20-bit physical address at bits 19:0, and a 10-bit ZCM pool prefix at bits 31:22. Such a physical address may be illustrated as follows (with bit locations in the physical address represented as values inside square brackets following "PA"):

| PA[31:22] | PA[21:20] | PA[19:0] |
|---|---|---|
| ZCM Pool Prefix | OTAG | physical addressing bits |

To generalize, the number of PABs may be represented by "Y." Accordingly, $2^Y$) is the size of each ZCM region (e.g., machine ZCM region 46, host physical ZCM region 44A, guest virtual ZMC region 57, etc.). Also, if "N" represents the number of VMs which can use the machine ZCM region, and "NB" represents the number of bits needed to accommodate OTAGs for N VMs, then $N=2^{NB}$. In other words, $NB=\text{ceiling}(\log_2 N)$. Also, the first bit of the ZCM pool prefix may be represented as "X," and X may be computed as Y+NB. For instance, in the above example, X=20+2=22. And the physical address may be illustrated more generally as follows:

| PA[Max_PA-1:X] | PA[X-1:Y] | PA[Y-1:0] |
|---|---|---|
| ZCM Pool Prefix | OTAG | physical addressing bits |

In one scenario, VMM 30 allocates the host physical ZCM regions (labeled below as Regions A through D) for four VMs (labeled VM-A through VM-D). Also, those host physical ZCM regions span the following HPAs:

Region A: 0xAB40_0000 through 0xAB4F_FFFF

Region B: 0xAB50_0000 through 0xAB5F_FFFF

Region C: 0xAB60_0000 through 0xAB6F_FFFF

Region D: 0xAB70_0000 through 0xAB7F_FFFF

In that scenario, Max_PA is 32. Also, Y is 20, because there are 20 PABs (e.g., the maximum value that can be contained in 20 bits is 0xF_FFFF); and NB is 2, because 2 bits are used to encode the OTAGs. The OTAG is at bits 22−1:20=21:20. And bits 32−1:22=31:22 contain the ZCM pool prefix.

To configure a host physical ZCM pool to contain such host physical ZCM regions, VMM 30 may load a value of 0xAB40_0000 into the ZCM base register, and VMM 30 may load a value of 0xFFC0_0000 into the ZCM mask register. The value in the ZCM mask register may be referred to as the "ZCM mask." Memory controller 18 may subsequently use the ZCM mask to convert HPAs within the host physical ZCM pool into corresponding addresses with machine ZCM region 46.

In that scenario, four VMs may share a machine ZCM region that is 1 MB in size, with VMM 30 setting aside a host physical ZCM pool that is 4 MB in size within the host PAS. Within that host physical ZCM pool, VMM 30 may allocate a different host physical ZCM region of 1 MB in size for each VM. The host physical ZCM pool provides 4 MB of system address space, but that address space is not backed by 4 MB of machine memory. Instead, it is backed by 1 MB of machine memory. The four different host physical ZCM regions operates as alias of each other, in that memory controller 18 can map each of those regions to the same region of machine memory. In particular, memory controller 18 may use the data in the ZCM remap register as a remap address to remap the machine ZCM region to an HPA. In addition, memory controller 18 may abort any direct accesses to the machine ZCM region.

As indicated above with regard to block 114 of FIG. 2, for each VM, VMM 30 allocates a guest physical ZMC region within the host physical ZCM pool. Specifically, in the scenario described above involving four VMs, VMM 30 allocates a 4-MB host physical ZCM pool starting at an address that is 4-MB aligned. For instance, VMM 30 may allocate the host physical ZCM pool starting at a base address of 0xAB40_0000. Accordingly, as indicated above, VMM 30 may set the ZCM base register to 0xAB40_0000. VMM 30 may also set the ZCM mask register to 0xFFC0_0000. Accordingly, VMM 30 may also create the following SPT mappings for Regions A-D:

| Region: HPA Range | VM-A SPT Mapping | VM-B SPT Mapping | VM-C SPT Mapping | VM-D SPT Mapping |
|---|---|---|---|---|
| A: 0xAB40_0000 to 0xAB4F_FFFF | Read/Write | Not mapped | Not mapped | Not mapped |
| B: 0xAB50_0000 to 0xAB5F_FFFF | Not mapped | Read/Write | Not mapped | Not mapped |
| C: 0xAB60_0000 to 0xAB6F_FFFF | Not mapped | Not mapped | Read/Write | Not mapped |
| D: 0xAB70_0000 to 0xAB7F_FFFF | Not mapped | Not mapped | Not mapped | Read/Write |

Thus, the SPT for VM-A maps Region A to the machine ZCM region, the SPT for VM-B maps Region B to the machine ZCM region, the SPT for VM-C maps Region C to the machine ZCM region, and the SPT for VM-D maps Region D to the machine ZCM region.

In one scenario, different VMs serve as source VMs and destination VMs at different times, according to the following sequence:

VM-A (source)→VM-B (destination).
VM-B (source)→VM-C (destination).
VM-C (source)→VM-D (destination).
VM-D (source)→VM-A (destination).

That scenario starts with VM-A creating data at cache line 0xAB40_0000. While the data is being created by VM-A, the other VMs have no access that data, since that address is not mapped in the SPT of any other VM. When the VM-A is ready to send the data to VM-B, VM-A executes the CLSND instruction. The CLSND instruction causes a demotion of cache line at the target address from the core side cache to the last level cache, and it also overwrites the OTAG of that cache line to be the ITAG of VM-B. Consequently, once the cache line is demoted to LLC, its tag in LLC is 0xAB50_0000. VM-B can then access the cache line at 0xAB50_000 to access the data that was produced by VM-A. While VM-B is operating on this data, the other VMs cannot read that data or change that data, since that address is not mapped in SPT of any VM other than VM-B. VM2 can now invoke the CLSND instruction to send the data to VM-C, at which point the cache line OTAG gets rewritten to be the ITAG of the VM3, and the data now becomes visible at address 0xAB60_0000. However, the data line itself did not move and stays in the same location in machine memory. Nevertheless, the changes to the cache tag cause accessibility to the data to change, as the data is sent from source to destination.

CLSND (Continued)

In one embodiment, when a source VM executes the CLSND instruction, the instruction operates according to the following pseudocode:

- Parameters:
    ○ M64: a register containing the GVA of the target data.
    ○ R64: a register containing the index for the ITAG of the destination VM. For instance, the index can be a number from 0 to 3 to allow four possible destination VMs. In other examples, the processor may allow lower or higher indices (e.g., from 0 to 7 to allow eight possible destination VMs).
- target-HPA = GET-HPA(M64).
- if write is not permitted to target-HPA then
    ○ raise error and abort.
- CLSND-IDI-OP(target-HPA, R64).

In the above pseudocode, CLSND-IDI-OP denotes a microinstruction to be executed by ZCM manager 90 (e.g., by portions of ZCM manager 90 within memory controller 18).

In one embodiment, the CLSND-IDI-OP microinstruction operates according to the following pseudocode:

- destination-index = R64[1:0]. The value at bits 1:0 of R64 will be used an index into the DEST-ITAGS register for the current VM.
- destination-ITAG = DEST-ITAGS[destination-index]
- source-ITAG = VM-ITAG.
- current-OTAG = GET-OTAG(target-HPA).
- if source-ITAG /= current-OTAG then
    ○ raise error and abort.
- if snoop filter hit on M64 then
    ○ demote cache line to LLC.
    ○ change OTAG of target-HPA to destination-ITAG.
    ○ exit.
- if LLC hit on M64 then
    ○ change OTAG of target-HPA to destination-ITAG.
    ○ exit.
- read cache line at target-HPA from RAM into LLC
- change OTAG of target-HPA to destination-ITAG.

Upon completion of the CLSND instruction, if no errors were raised, the LLC will contain the target cache line, and the OTAG for that cache line will match the ITAG for the destination VM.

REP-CLSND

Processor 12 may also support an instruction to enable a source VM to change the OTAGs for multiple consecutive cache lines. Such an instruction may be referred to as a "repeat cache line send" (REP-CLSND) instruction or a "send request." The REP-CLSND instruction may include a parameter to denote the number of cache lines to send to the destination VM. The REP-CLSND instruction may be implement using a microcode loop with microcode that executes the CLSND operations for each cache line in the specified range. In another embodiment, ZCM manager 90 includes a tag rewriting engine that accepts an iteration count and a start physical address from the REP-CLSND instruction, and in response to a single IDI opcode, that tag rewriting engine updates the OTAGs on multiple cache lines that map to the same cache slice, thereby reduce the number of IDI transactions needed to do complete the send operations.

Thus, a source VM may change the OTAG for one or more cache lines to move the machine memory for those cache lines from the host PAS of the source VM to the host PAS of a destination VM. In other words, a source VM may push data to a destination VM.

CLRCV

Processor 12 may also support instructions for pulling data to a destination or "consumer" VM from a source VM. An instruction to enable a consumer VM to change the OTAG of a cache line from the OTAG of a source VM to the OTAG of the consumer VM may be referred to as a "cache line receive" (CLRCV) instruction or a "receive request." The pull model may be used in cases where the source VM does not proactively send the data to the consumer VM, but instead allows the consumer VM to get the data if needed. For instance, a source VM may include a network interface controller (NIC) which produces a packet. The source VM may then send the packet header to the consumer VM In most cases, the consumer VM may only need to operate on the packet header, with no need to access the data of the packet payload. In such cases, there is no need to change the OTAG of the packet payload from that of the source VM to that of the consumer VM.

In one scenario, the pull model may be used on a packet processing pipeline involving VMs that pass packets to each other according to the following sequence:

VM1→VM2→VM3→VM1

Also, in this scenario, VM1 has a NIC assigned to it, and the NIC produces packet headers and payloads in the host physical ZCM pool. In particular, the NIC stores the data for the packet headers and payloads in the host physical ZCM region of VM1. The packet header and data for a packet thus start out with the OTAG of VM1. VM1 then sends the packet header to VM2, which does transforms on the packet header. VM2 then sends the packet header to VM3. VM3, as part of its packet processing, may need to operate on the packet header and the payload. The packet header was sent to VM3, but now VM3 needs to receive the payload data, which is currently tagged with OTAG of VM1. VM3 may then use the CLRCV instruction to change that OTAG to the OTAG of VM3. Then, after processing the payload, VM3 sends the packet header and payload data to VM1. VM1 may then use CLRCV to change the OTAG back to the OTAG of VM1, and VM1 may then transmit the packet using the NIC assigned to VM1.

The CLRCV instruction enables a consumer VM to receive a cache line from an original VM that is not necessarily the immediately preceding source VM. However, the CLRCV instruction does not enables the consumer VM to receive that cache line if the original source VM has not explicitly authorized the consumer VM to receive that cache line. In one embodiment, the original source VM creates a token to provide the ITAG for an approved consumer VM, and the CLRCV instruction uses that token to verify that the consumer VM has been authorized by the original source VM. Such a token may be referred to as a "consumer token."

In one embodiment, consumer tokens are implemented as elements of an array data structure that is located in the address space of VMM 30, but that memory is not mapped into the address space of any VMs. Each element of the array contains following information:

Start-PA: Start physical address.

End-PA: End physical address.

Owner-ITAG: ITAG of the current owner of the token. Also, VMM 30 may initially populate that array with one token for each VM, to associate current owner ITAGS with corresponding address ranges. For instance, VMM 30 may initialize the first element with data for the first VM, as indicated below, and VMM 30 may initialize the other elements with data for the other VMs, accordingly.

Start-PA: Start physical address for host physical ZCM region 44A.

End-PA: End physical address for host physical ZCM region 44A.

Owner-ITAG: ITAG 52A (i.e., the ITAG for VM 50A).

MKTOKEN

Processor 12 supports an instruction which enables a source VM to create or change a consumer token. That instruction may be referred to as a "make token" (MKTOKEN) instruction. The MKTOKEN instruction takes following operands or parameters:

r1: start-GVA. Start guest virtual address.

r2: length.

r3: destination-ITAG-index. Index to the ITAG of the authorized consumer VM.

r4: token-index.

When executed, the MKTOKEN instruction operates according to the following pseudocode:

- start-PA = GET-HPA(start-GVA) and test for write permission.
- end-PA = start-PA + length.
- if token-index > MAX_TOKEN_INDEX then
  - raise error (e.g., general protection fault) and abort.
- // Compute the physical address for the token to be changed.
- token-PA = TOKEN_ARRAY_BASE + token-index * CONST_TOKEN_SIZE
- // Verify that the VM which is modifying the token is the current owner of that token.
- if token-PA->owner-ITAG /= VM-ITAG then
  - raise error and abort.
- new-owner-ITAG = DEST-ITAGS[destination-ITAG-index].

- // Record the new owner in the token and the address range allowed to be operated on with this token:
- token-PA->start-PA = start-PA.
- token-PA->end-PA = end-PA.
- token-PA->owner-ITAG = new-owner-ITAG.

In the scenario described above, VM1 may use MKTOKEN to create a consumer token which identifies VM3 as an authorized consumer for the memory range containing the packet payload.

CLRCV (Continued)

VM3 (i.e., the consumer VM) may subsequently use CLRCV to take over ownership of that target memory range. The CLRCV instruction may operate according to the following pseudocode:

- Parameters:
  - M64: a register containing the GVA of the target data.
  - R64: a register containing (a) an index to the ITAG of the original source VM, and (b) an index to the consumer token that was created by the original source VM for the consumer VM. For instance, for an index range from 0-3, bits 1:0 of R64 may contain the index to the ITAG of the original source VM, and bits 63:32 may specify the index of the consumer token. However, other embodiments may use fewer or more bits to contain smaller or larger index ranges.
- token-index = R64[63:32].
- token-PA = TOKEN_ARRAY_BASE + token-index * CONST_TOKEN_SIZE.
- if token-PA->owner-ITAG /= VM-ITAG then
  - raise error and abort.
- target-HPA = GET-HPA(M64) and test for write permission.
- if target-HPA < token-PA->start-PA OR target-HPA > token-PA->end-PA then
  - raise error and abort.
- source-index = R64[1:0]. Source-index gets the index (within the DEST-ITAGS of the consumer VM) to the ITAG for the source VM.
- CLRCV-IDI-OP(ADDR=target-HPA, source-index).

In the above pseudocode, CLRCV-IDI-OP denotes a microinstruction to be executed by ZCM manager 90 (e.g., by portions of ZCM manager 90 within memory controller 18). That instruction may involve length wires, and source-index parameter may be passed on those length wires. Alternatively, the index to the source ITAG may be carried on a different set of wires. A parameter value for length may not be needed, because the instruction may simply process a full cache line.

In one embodiment, the CLRCV-IDI-OP microinstruction operates according to the following pseudocode:

- source-ITAG = DEST-ITAGS[source-index].
- consumer-ITAG = VM-ITAG.
- current-OTAG = GET-OTAG(target-HPA).
- if current-OTAG /= source-ITAG then
  - raise error and abort.
- if snoop filter hit on target-PA then
  - demote cache line at target-PA to LLC.
  - change OTAG of target-HPA to consumer-ITAG.
  - exit.
- If LLC hit on target-PA then
  - change OTAG of target-HPA to consumer-ITAG.
  - exit.
- read cache line at target-HPA from RAM into LLC.
- change OTAG of target-HPA to consumer-ITAG.

Upon completion of the CLRCV instruction, if no errors were raised, the LLC will contain the target cache line, and the OTAG for that cache line will match the ITAG for the consumer VM. The process for executing a CLRCV instruction is also described below with regard to FIG. 3.

Figure 3:
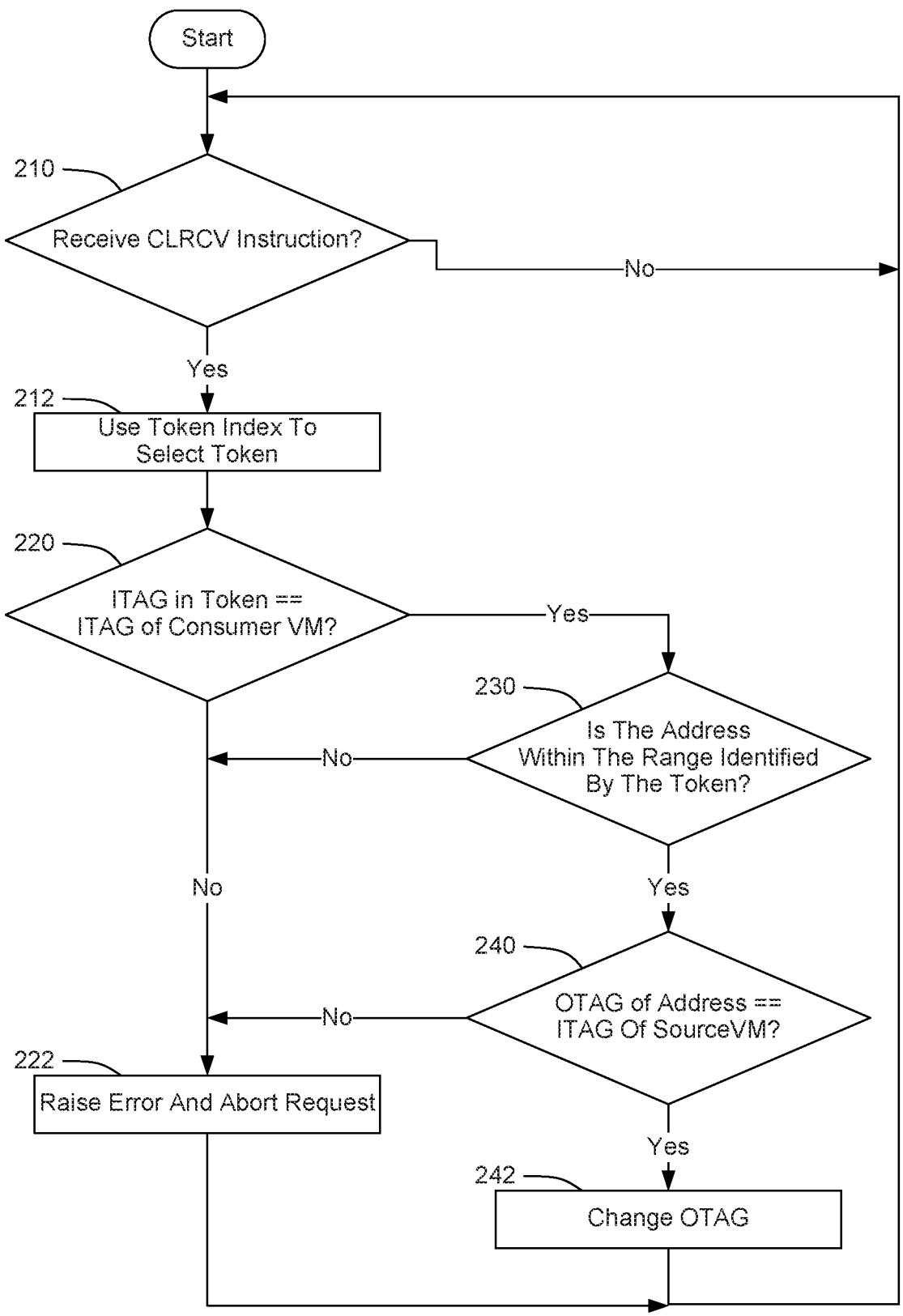
FIG. 3 is a flowchart of an example embodiment of a process for moving data between VMs without copying that data, in response to a receive request.

FIG. 3 is a flowchart of an example embodiment of a process for moving data between VMs without copying that data, in response to a receive request such as a CLRCV instruction. The process of FIG. 3 begins with ZCM manager 90 determining whether it has received a CLRCV instruction from a VM, as shown at block 210. As indicated above, the VM that is executing the CLRCV instruction may be referred to as the "consumer VM," and the parameters to the CLRCV instruction may include a token index to identify a target token, a source index to identify the ITAG of a source VM, and a GVA to identify a target address for the OTAG change.

As shown at block 212, when ZCM manager 90 receives a CLRCV instruction, it may respond by using the token index to select a target token. As shown at block 220, ZCM manager 90 may then determine whether the ITAG in that target token matches the ITAG of the consumer VM. As shown at block 222, if the ITAG in the token does not match the ITAG of the consumer VM, ZCM manager 90 may raise an error and abort the request. However, if the ITAG in the token and the ITAG of the consumer VM do match, ZCM manager 90 may then determine whether the target address is within the address range identified by the token, as shown at block 230. If the target address is not within the address range identified by the token, ZCM manager 90 may raise an error and abort the instruction, as shown at block 222.

However, if the target address is within the address range identified by the token, ZCM manager may then determine whether the current OTAG for that address matches the ITAG for the source VM, based on the source index parameter and the DEST-ITAGS register of the current VM. If the current OTAG for the target address does not match the ITAG for the source VM, ZCM manager 90 may raise an error and abort the instruction, as shown at block 222. However, if the current OTAG for the target address does match the ITAG for the source VM, ZCM manager 90 may then change the OTAG of the cache line that contains the target address to match the ITAG of the consumer VM, as shown at block 242.

REP-CLRCV

Processor 12 also supports an instruction to enable a consumer VM to receive multiple cache lines. That instruction may be referred to as a "repeat cache line receive" (REP-CLRCV) instruction or a "receive request." One parameter to that instruction may be a register ("RCX") to indicate the number of cache lines to receive. REP-CLRCV may be implemented as a microcode loop where microcode generates a CLRCV-IDI-OP for each cache line in the range. Alternatively, REP CLRCV may send the iteration count and a start physical address to a tag rewriting engine in the cache slice, such that a single IDI opcode can be used to update the cache line tags on multiple cache lines that map to the same cache slice, thereby reducing the number of IDI transactions needed to do the receive operation.

The REP-CLRCV instruction may perform operations according to the following pseudocode:

- token-index = R64[63:32].
- token-PA = TOKEN_ARRAY_BASE + token-index * CONST_TOKEN_SIZE.
- if token-PA->owner-ITAG /= VM-ITAG then
  ○ raise error and abort.
- target-PA = GET-HPA(M64) and test for write permission.
- start-PA = target-PA.
- end-PA = target-PA + RCX * 64.
- if start-PA < token-PA->start-PA OR end-PA > token-PA->end-PA then
  ○ raise error and abort.
- source-index = R64[1:0].
- WHILE RCX > 0
  ○ CLRCV-IDI-OP(ADDR=end-PA, length=source-index).
  ○ decrement RCX.
  ○ end-PA = end-PA − 64.
  ○ open interrupt windows to detect any interrupts/events.
- ENDWHILE Thus, this instruction does receive operations backwards, from highest address to lowest address. Also, while performing those receive operations, between each iteration, the instruction also opens the interrupt window to detect any interrupts/events. If any interrupts/events were detected, then the instruction can be restarted after handling those interrupts/events. Since the instruction works backwards and RCX decrements on each iteration, the instruction can be restarted without any further instruction operand changes by software.

In one embodiment, a processor includes caches that are organized in slices, with some bits of the physical address being used to determine the slice index. In such an embodiment, when the slice hash is computed, the OTAG bits are ignored in the slice hash computation, such that all address aliases which differ only in OTAG bits map to the same cache slice. This may be accomplished by the VMM defining a mask that is to be applied to a physical address before computing the slice hash. That mask may be referred to as a "ZCM-slice-hash-mask," and it may have the OTAG bits set to 0. For instance, in a scenario such as the one described above, the VMM may define the ZCM-slice-hash-mask as 0xFF9F_FFFF. Consequently, that mask would cause bits 21:20 (i.e, the OTAG bits) to be masked in the slice hash.

For instance, a slice identifier may be computed according to the following pseudocode:

- PA-input-to-slice-hash = PA.
- ZCM-mask = the value in the ZCM mask register.
- ZCM-base = the value in the ZCM base register.
- IF (PA & ZCM-mask == ZCM-base & ZCM-mask) then
  ○ PA-input-to-slice-hash = PA-input-to-slice-hash & ZCM-slice-hash-mask.
- slice-id = slice-hash(PA-input-to-slice-hash)

Consequently, all address aliases which differ only in OTAG bits will map to the same cache slice.

In an alternative embodiment, a data processing system may use keys to encrypt data in memory, and key identifiers (KIDs) for those keys may be used as OTAGs. For instance, a data processing system may use technology like that provided by Intel Corporation under the name or trademark of "Multi-key Total memory encryption" (MK-TME). In particular, a KID forms part of each physical memory address, and that KID can be used as the OTAG on the cache lines. In one embodiment, the VMM allocates a region of machine memory as the machine ZCM region, and the VMM maps that region into the guest physical memory for each VM with the KID assigned to that VM. The VMM may initialize the machine ZCM region using the KID assigned to the first VM in the chain. Alternately, the VMM may give some buffers to each VM, and the VMM may initialize each buffer with KID assigned to the respective VM.

Additional Embodiments

FIGS. 4-8 are block diagrams of exemplary computer architectures. Such architectures may include technology for controlling access to processor debug features as described herein. The same or similar elements in FIGS. 4-8 bear like reference numerals. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
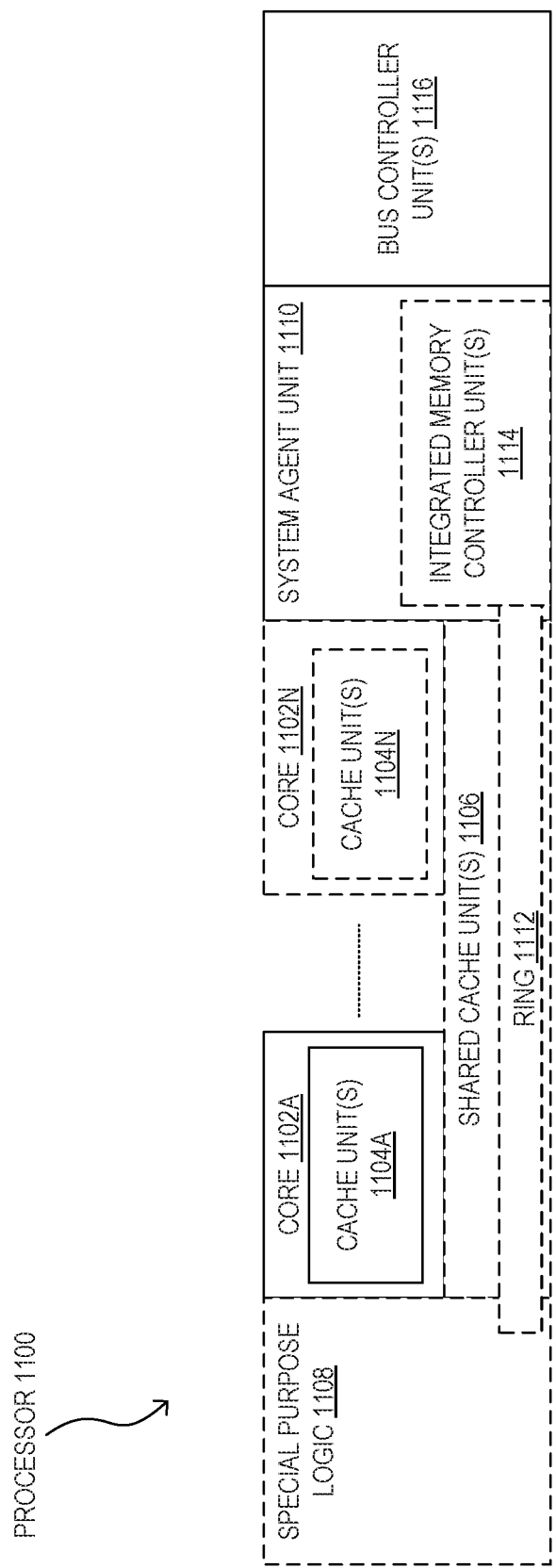
FIG. 4 is a block diagram of a processor that may have more than one core, may have an integrated memory controller, and may have integrated graphics according to one or more embodiments.

FIG. 4 is a block diagram of a processor 1100 that may have more than one core, may have an integrated memory controller, and may have integrated graphics according to one or more embodiments. The solid lined boxes in FIG. 4 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as L2, level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

Figure 5:
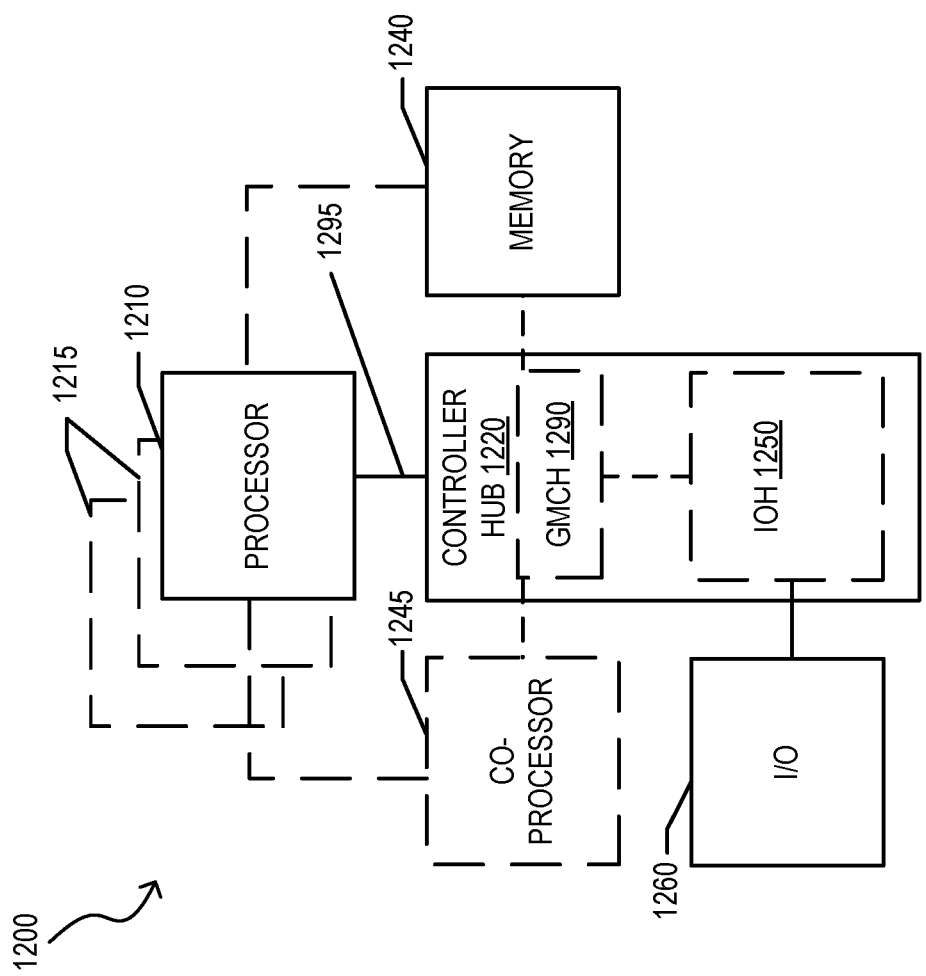
FIG. 5 is a block diagram of a system according to one or more embodiments.

FIG. 5 is a block diagram of a system 1200 according to one or more embodiments. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor, the memory 1240 and the coprocessor 1245 are coupled directly to the processor 1210, and the controller hub 1220 is in a single chip with the IOH 1250.

The optional nature of additional processors 1215 is denoted in FIG. 5 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 6:
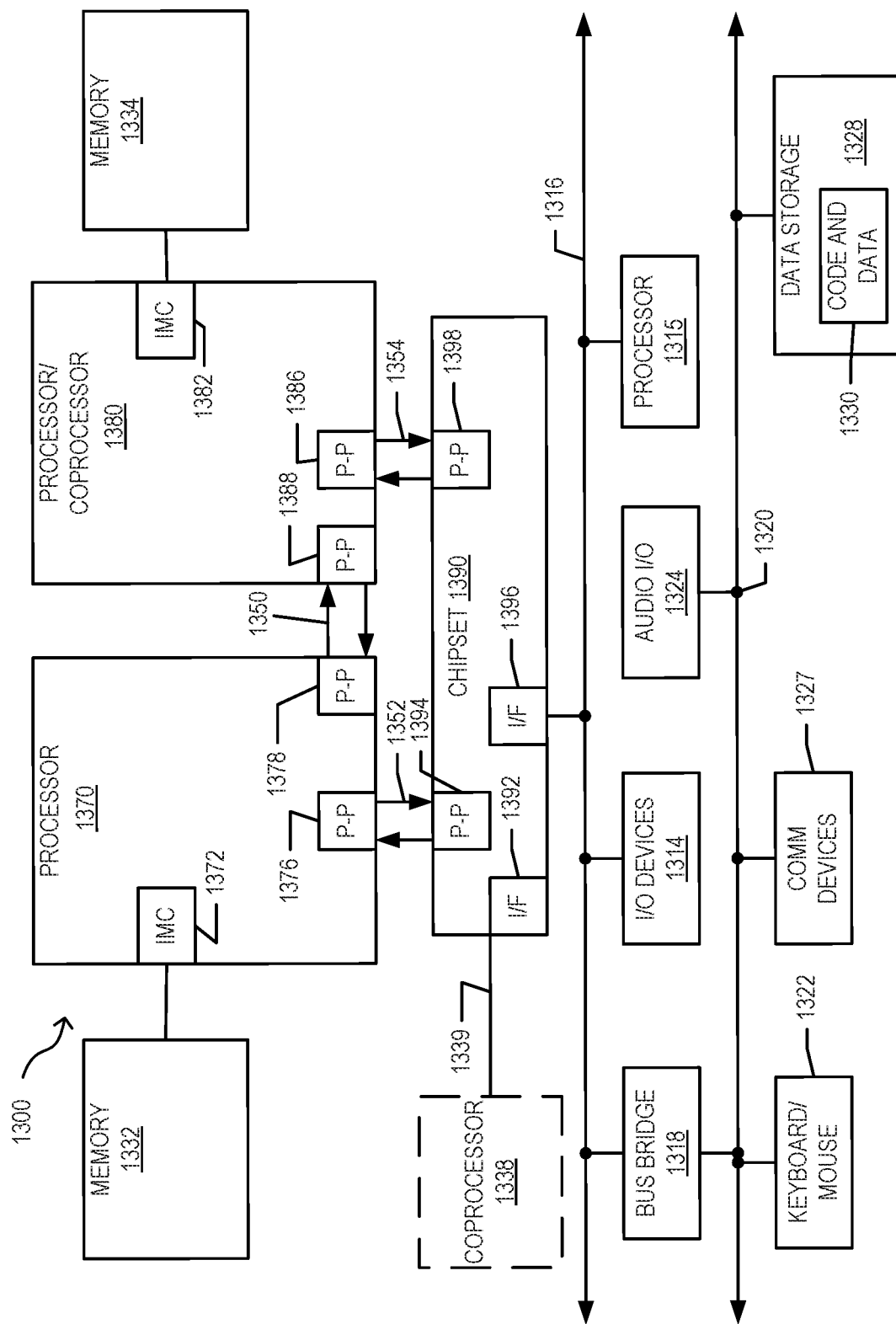
FIGS. 6-7 are block diagrams of more specific exemplary systems according to one or more embodiments.
Figure 7:
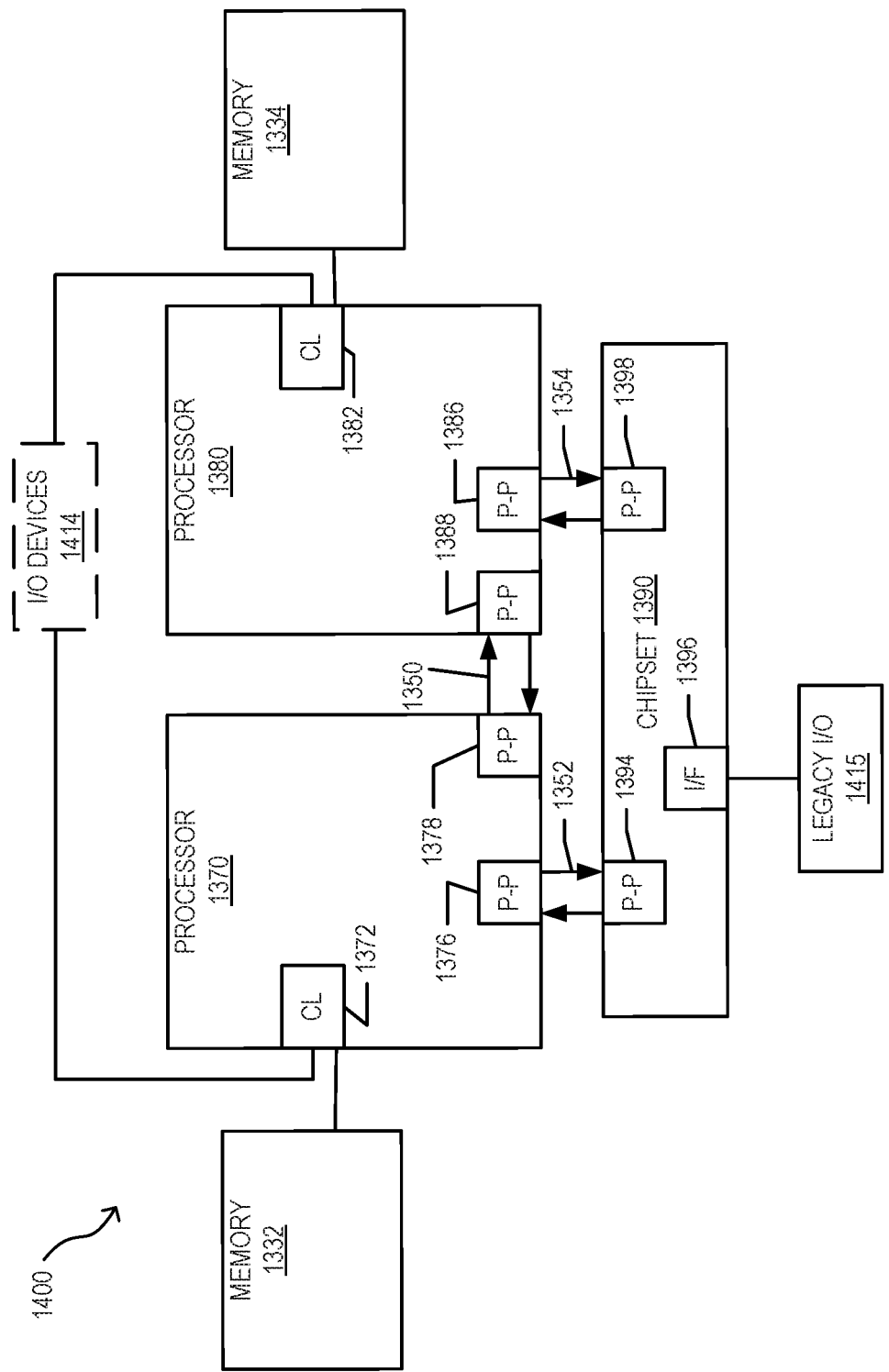

FIGS. 6 and 7 are block diagrams of more specific exemplary systems 1300 and 1400 according to one or more embodiments. As shown in FIG. 6, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 6, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 6, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays (FPGAs), or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 6, a system may implement a multi-drop bus or other such architecture.

FIG. 7 presents a block diagram of a second more specific exemplary system 1400 in accordance with on one or more embodiments. Certain aspects of FIG. 6 have been omitted from FIG. 7 in order to avoid obscuring other aspects of FIG. 7.

FIG. 7 illustrates that the processors 1370, 1380 may include integrated memory and I/O control logic ("CL") 1372 and 1382, respectively. Thus, the CL 1372, 1382 include integrated memory controller units and include I/O control logic. FIG. 7 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 8:
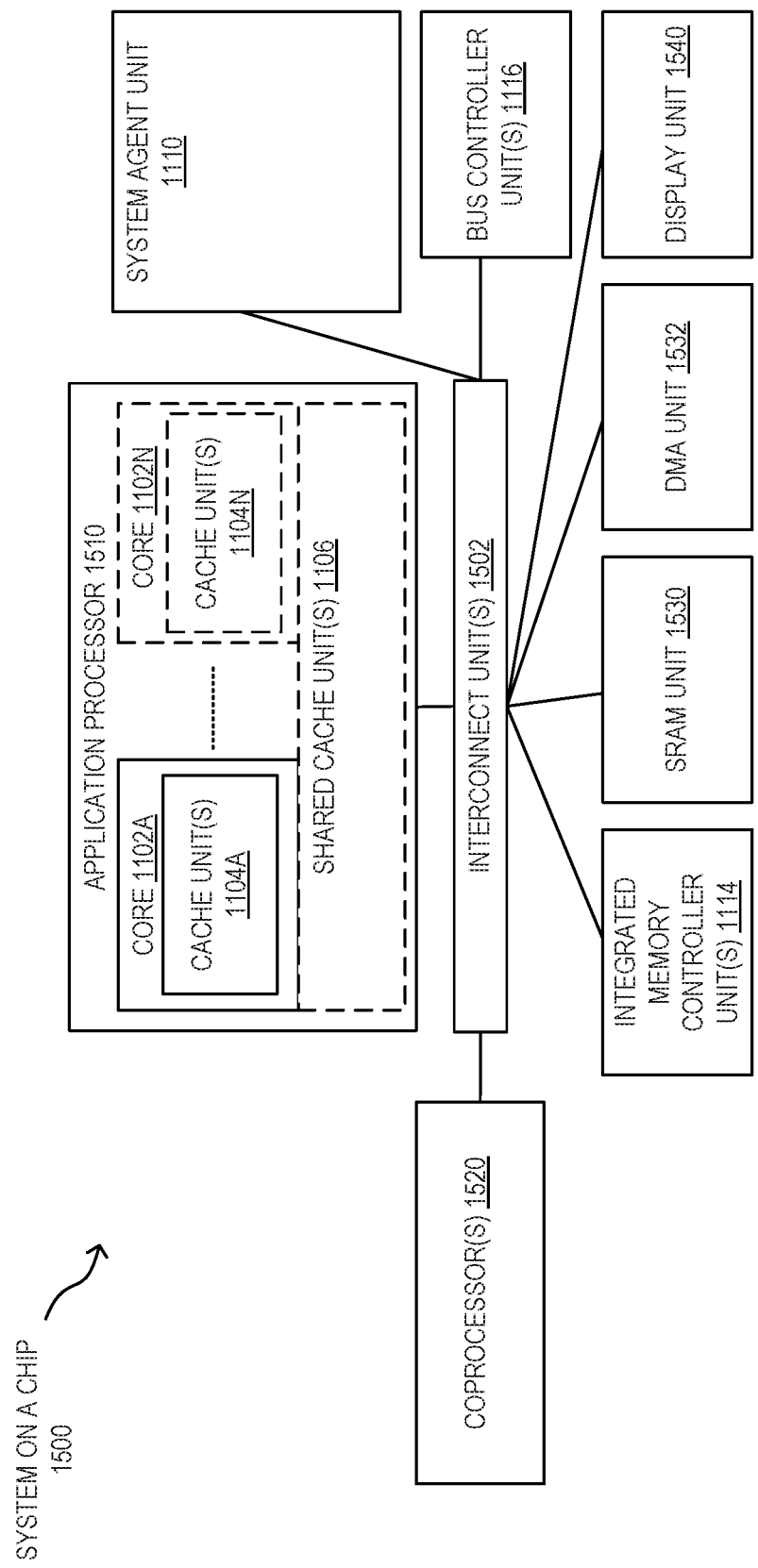
FIG. 8 is a block diagram of a system on a chip according to one or more embodiments.

FIG. 8 is a block diagram of a system on a chip (SoC) 1500 according to one or more embodiments. Dashed lined boxes are optional features on more advanced SoCs. In FIG. 8, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, security processor, or the like.

CONCLUSION

As indicated above, a processor includes a ZCM manager which enables software components such as VMs to move data from one software component to another without copying that data. For instance, a first VM may use a send request to send the data in a cache line from the first VM to a second VM by changing the OTAG for that cache line. Alternatively, the first VM may create a token to identify the second VM as an authorized consumer VM for a specified region that is owned by the first VM, and the second VM may then use a receive request to change the OTAG for that region to match the ITAG for the second VM.

In addition, the present teachings may be used to move data between other types of components. For instance, the present teachings may be applied to communications between processes, to communications between artificial intelligence (AI) accelerators, or to communications between CPU subsystems and AI accelerators.

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, according to the present disclosure, a device may include instructions and other data which, when accessed by a processor, enable the device to perform particular operations. For purposes of this disclosure, instructions which enable or cause a device to perform operations may be referred to in general as "software." Software and the like may also be referred to as "control logic." Software that is used during a boot process may be referred to as "firmware." Software that is stored in nonvolatile memory of a processor may also be referred to as "firmware." Software may be organized using any suitable structure or combination of structures. Accordingly, terms like program and module may be used in general to cover a broad range of software constructs, including without limitation application programs, subprograms, routines, functions, procedures, drivers, libraries, data structures, processes, firmware, microcode, and other types of software components. Also, it should be understood that a software module may include more than one component, and those components may cooperate to complete the operations of the module. Also, the operations which the software causes a device to perform may include creating an operating context, instantiating a particular data structure, etc. Embodiments may be implemented as software to execute on a programmable system comprising at least one processor, a storage system (e.g., volatile memory and/or one or more non-volatile storage elements), at least one input device, and at least one output device.

Any suitable operating environment and programming language (or combination of operating environments and programming languages) may be used to implement software components described herein. For example, program code may be implemented in a high-level procedural or object-oriented programming language, or in assembly or machine language. The mechanisms described herein are not limited to any particular programming language. The language may be a compiled or interpreted language.

A medium which contains data and which allows another component to obtain that data may be referred to as a machine-accessible medium or a machine-readable medium. Accordingly, embodiments may include machine-readable media containing instructions for performing some or all of the operations described herein. Such media may be referred to in general as "apparatus" and in particular as "program products." In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language.

The machine-readable media for some embodiments may include, without limitation, tangible non-transitory storage components such as magnetic disks, optical disks, magneto-optical disks, dynamic random access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. For instance, in some embodiments, some or all of the control logic for implementing some or all of the described operations may be implemented in hardware logic (e.g., as firmware and/or microcode in an integrated circuit chip, as a programmable gate array in a chip, as an application-specific integrated circuit in a chip, as any other suitable type of hardware circuitry in a chip, or as a combination of two or more different instances and/or types of hardware logic in one or more chips). Also, terms such as "circuit" and "circuitry" may be used interchangeably herein. Those terms and terms like "logic" may be used to refer to analog circuitry, digital circuitry, hard-wired circuitry, programmable circuitry, processor circuitry, microcontroller circuitry, hardware logic circuitry, state machine circuitry, any other type of hardware component, or any suitable combination of hardware components.

Additionally, the present teachings may be used to advantage in many different kinds of data processing systems. Such data processing systems may include, without limitation, accelerators, systems on a chip, wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. For instance, two components in a data processing system may be described as being "in communication with" each other if those two components are capable of communicating with each other (possibly via one or more intermediate components) when the data processing system is operating.

Also, some components of a data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line.

Also, for purpose of this disclosure, the term "processor" denotes a hardware component that is capable of executing software. For instance, a processor may be implemented as a central processing unit, as a processing core, or as any other suitable type of processing element. A central processing unit may include one or more processing cores, and a device may include one or more central processing units.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

Similarly, components which have been described as residing within other components in an example embodiment may be arranged differently in alternative embodiments. For instance, at least some of the components described above as residing in non-volatile storage in a processor may reside in non-volatile storage outside of the processor in alternative embodiments.

Embodiments include the following examples:

Example A1 is a processor comprising a core to execute instructions, a cache to store data, and a ZCM manager in communication with the core and the cache. The ZCM manager is to, in response to receiving an access request from a first software component, wherein the access request involves a memory address within a cache line: (a) compare an OTAG associated with the memory address against a first ITAG for the first software component, (b) if the OTAG matches the first ITAG, complete the access request, and (c) if the OTAG does not match the first ITAG, abort the access request. Also, in response to a send request from the first software component, the ZCM manager is to change the OTAG associated with the memory address to match a second ITAG for a second software component.

Example A2 is processor according to Example A1, wherein the ZCM manager is to associate OTAGs with cache lines, and the ZCM manager is to respond to the send request by changing the OTAG of the cache line that includes the memory address to match the second ITAG.

Example A3 is a processor according to Example A1, wherein the ZCM manager enables the first software component to use the send request to change the OTAG associated with the memory address to match the second ITAG without calling a VMM. Example A3 may also include the features of Example A2.

Example A4 is a processor according to Example A1, wherein the first software component comprises a first VM to which the first ITAG has been assigned, and the second software component comprises a second VM to which the second ITAG has been assigned. Also, the processor further comprises an MMU to translate a GPA associated with the access request to an HPA that comprises the OTAG. Also, the operation of comparing the OTAG associated with the memory address against the first ITAG for the first software component comprises comparing the first ITAG that has been assigned to the first VM against the OTAG in the HPA to verify whether the first VM owns a cache line that includes the HPA. Example A4 may also include the features of any one or more of Examples A2-A3.

Example A5 is a processor according to Example A4, wherein the ZCM manager enables a VMM to (i) reserve a portion of machine memory as a machine ZCM region; (ii) allocate a first host physical ZCM region for the first VM, wherein the first host physical ZCM region has a first OTAG; (iii) allocate a second host physical ZCM region for the second VM, wherein the second host physical ZCM region has a second OTAG; (iv) map a cache line from the machine ZCM region to the first host physical ZCM region if the HPA comprises the first OTAG; and (v) map the cache line from the machine ZCM region to the second host physical ZCM region if the HPA comprises the second OTAG.

Example A6 is a processor according to Example A1, wherein the ZCM manager is further to, in response to a receive request from a third software component that executes on the core, change the OTAG associated with the memory address to match a third ITAG for the third software component. Example A6 may also include the features of any one or more of Examples A2-A5.

Example A7 is a processor according to Example A6, wherein the ZCM manager is further to (i) determine whether the OTAG associated with the memory address matches a specified ITAG for a source software component; and (ii) abort the receive request without changing the OTAG associated with the memory address in response to a determination that the OTAG associated with the memory address does not match the specified ITAG for the source software component.

Example B1 is a data processing system comprising RAM, a processor in communication with the RAM, a core in the processor, a cache in the processor, and a ZCM manager in the processor, in communication with the core and the cache. The ZCM manager is to receive an access request from a first software component that executes on the core, wherein the access request involves a memory address within a cache line. In response to receiving the access request, the ZCM manager is to (i) compare an OTAG associated with the memory address against a first ITAG for the first software component, (ii) if the OTAG matches the first ITAG, complete the access request, and (iii) if the OTAG does not match the first ITAG, abort the access request. Also, in response to a send request from the first software component, the ZCM manager is to change the OTAG associated with the memory address to match a second ITAG for a second software component that executes on the core.

Example B2 is a data processing system according to Example B1, wherein the ZCM manager is to associate OTAGs with cache lines, and the ZCM manager is to respond to the send request by changing the OTAG of the cache line that includes the memory address to match the second ITAG.

Example B3 is a data processing system according to Example B1, wherein the ZCM manager enables the first software component to use the send request to change the OTAG associated with the memory address to match the second ITAG without calling a VMM. Example B3 may also include the features of Example B2.

Example B4 is a data processing system according to Example B1, wherein the first software component comprises a first VM to which the first ITAG has been assigned, the second software component comprises a second VM to which the second ITAG has been assigned, and the processor further comprises an MMU to translate a GPA associated with the access request to an HPA that comprises the OTAG. Also, the operation of comparing the OTAG associated with the memory address against the first ITAG of the first software component comprises comparing the first ITAG that has been assigned to the first VM against the OTAG in the HPA to verify whether the first VM owns a cache line that includes the HPA. Example B4 may also include the features of any one or more of Examples B2-B3.

Example B5 is a data processing system according to Example B4, wherein the ZCM manager enables a VMM to (i) reserve a portion of machine memory as a machine ZCM region; (ii) allocate a first host physical ZCM region for the first VM, wherein the first host physical ZCM region has a first OTAG; (iii) allocate a second host physical ZCM region for the second VM, wherein the second host physical ZCM region has a second OTAG; (iv) map a cache line from the machine ZCM region to the first host physical ZCM region if the HPA comprises the first OTAG; and (v) map the cache line from the machine ZCM region to the second host physical ZCM region if the HPA comprises the second OTAG.

Example B6 is a data processing system according to Example B1, wherein the ZCM manager is further to, in response to a receive request from a third software component that executes on the core, change the OTAG associated with the memory address to match a third ITAG for the third software component. Example B6 may also include the features of any one or more of Examples B2-B5.

Example B7 is a data processing system according to Example B6, wherein the ZCM manager is further to determine whether the OTAG associated with the memory address matches a specified ITAG for a source software component, and abort the receive request without changing the OTAG associated with the memory address in response to a determination that the OTAG associated with the memory address does not match the specified ITAG for the source software component.

Example C1 is a non-transitory machine-readable medium comprising instructions which, when executed by a processor, cause the processor to, in response to receiving an access request from a first software component, wherein the access request involves a memory address within a cache line: (a) compare an OTAG associated with the memory address against a first ITAG for the first software component; (b) if the OTAG matches the first ITAG, complete the access request, and (c) if the OTAG does not match the first ITAG, abort the access request. The instructions also cause the processor to, in response to a send request from the first software component, change the OTAG associated with the memory address to match a second ITAG for a second software component.

Example C2 is a machine-readable medium according to Example C1, wherein the instructions, when executed by the processor, cause the processor to, in response to a receive request from a third software component, change the OTAG associated with the memory address to match a third ITAG for the third software component.

Example C3 is a machine-readable medium according to Example C2, wherein the instructions, when executed by the processor, cause the processor to: (a) determine whether the OTAG associated with the memory address matches a specified ITAG for a source software component; and (b) abort the receive request without changing the OTAG associated with the memory address in response to a determination that the OTAG associated with the memory address does not match the specified ITAG for the source software component.

Example C4 is a machine-readable medium according to Example C1, wherein the machine-readable medium comprises at least one VM image to enable the processor to instantiate (a) a first VM to which the first ITAG is assigned and (b) a second VM to which the second ITAG is assigned. Also, the first VM comprises the first software component, and the second VM comprises the second software component. Example C4 may also include the features of any one or more of Examples C2-C3.

Example C5 is a machine-readable medium according to Example C4, wherein the send request enables the first VM to change the OTAG associated with the memory address to match the second ITAG without calling a VMM.

Example C6 is a machine-readable medium according to Example C4, wherein the instructions, when executed, cause an MMU in the processor to translate a GPA associated with the access request to an HPA that comprises the OTAG. Also, the operation of comparing the OTAG associated with the memory address against the first ITAG for the first software component comprises comparing the first ITAG that has been assigned to the first VM against the OTAG in the HPA to verify whether the first VM owns a cache line that includes the HPA. Example C6 may also include the features of Example C5.

Example C7 is a machine-readable medium according to Example C4, wherein the instructions comprise a VMM which, when executed by the processor, causes the processor to (a) reserve a portion of machine memory as a machine ZCM region; (b) allocate a first host physical ZCM region for the first VM, wherein the first host physical ZCM region has a first OTAG; (c) allocate a second host physical ZCM region for the second VM, wherein the second host physical ZCM region has a second OTAG; (d) map a cache line from the machine ZCM region to the first host physical ZCM region if the HPA comprises the first OTAG; and (e) map the cache line from the machine ZCM region to the second host physical ZCM region if the HPA comprises the second OTAG. Example C7 may also include the features of any one or more of Examples C5-C6.

In view of the wide variety of useful permutations that may be readily derived from the example embodiments described herein, this detailed description is intended to be illustrative only, and should not be construed as limiting the scope of coverage.

What is claimed is:

1. A processor, comprising:
a core to execute instructions;
a cache to store data; and
a zero-copy memory (ZCM) manager in communication with the core and the cache, the ZCM manager to:
in response to receiving an access request from a first software component, wherein the access request involves a memory address within a cache line:
(a) compare an owner tag (OTAG) associated with the memory address against a first identity tag (ITAG) for the first software component;
(b) if the OTAG matches the first ITAG, complete the access request, and
(c) if the OTAG does not match the first ITAG, abort the access request; and
in response to a send request from the first software component, wherein the send request specifies an ITAG for a destination software component, change the OTAG associated with the memory address to match the specified ITAG for the destination software component.

2. A processor according to claim 1, wherein:
the ZCM manager is to associate OTAGs with cache lines; and
the ZCM manager is to respond to the send request by changing the OTAG of the cache line that includes the memory address to match the specified ITAG.

3. A processor according to claim 1, wherein the ZCM manager enables the first software component to use the send request to change the OTAG associated with the memory address to match the specified ITAG without calling a virtual machine monitor.

4. A processor according to claim 1, wherein:
the first software component comprises a first virtual machine (VM) to which the first ITAG has been assigned;
the destination software component comprises a second virtual machine (VM) to which the specified ITAG has been assigned;
the processor further comprises a memory management unit (MMU) to translate a guest physical address (GPA) associated with the access request to a host physical address (HPA) that comprises the OTAG; and
the operation of comparing the OTAG associated with the memory address against the first ITAG for the first software component comprises comparing the first ITAG that has been assigned to the first VM against the OTAG in the HPA to verify whether the first VM owns a cache line that includes the HPA.

5. A processor according to claim 4, wherein the ZCM manager enables a virtual machine monitor to:
reserve a portion of machine memory as a machine ZCM region;
allocate a first host physical ZCM region for the first VM, wherein the first host physical ZCM region has a first OTAG;
allocate a second host physical ZCM region for the second VM, wherein the second host physical ZCM region has a second OTAG;
map a cache line from the machine ZCM region to the first host physical ZCM region if the HPA comprises the first OTAG; and
map the cache line from the machine ZCM region to the second host physical ZCM region if the HPA comprises the second OTAG.

6. A processor according to claim 1, wherein the ZCM manager is further to:
in response to a receive request from a consumer software component that executes on the core, change the OTAG associated with the memory address to match an ITAG for the consumer software component.

7. A processor according to claim 6, wherein the ZCM manager is further to:
determine whether the OTAG associated with the memory address matches a specified ITAG for a source software component; and
abort the receive request without changing the OTAG associated with the memory address in response to a determination that the OTAG associated with the memory address does not match the specified ITAG for the source software component.

8. A data processing system, comprising:
random access memory;
a processor in communication with the random access memory;
a core in the processor;
a cache in the processor; and
a zero-copy memory (ZCM) manager in the processor, in communication with the core and the cache, the ZCM manager to:
receive an access request from a first software component that executes on the core, wherein the access request involves a memory address within a cache line;
in response to receiving the access request, (i) compare an owner tag (OTAG) associated with the memory address against a first identity tag (ITAG) for the first software component, (ii) if the OTAG matches the first ITAG, complete the access request, and (iii) if the OTAG does not match the first ITAG, abort the access request; and
in response to a send request from the first software component, wherein the send request specifies an ITAG for a destination software component that executes on the core, change the OTAG associated with the memory address to match the specified ITAG for the destination software component.

9. A data processing system according to claim 8, wherein:
the ZCM manager is to associate OTAGs with cache lines; and
the ZCM manager is to respond to the send request by changing the OTAG of the cache line that includes the memory address to match the specified ITAG.

10. A data processing system according to claim 8, wherein the ZCM manager enables the first software component to use the send request to change the OTAG associated with the memory address to match the specified ITAG without calling a virtual machine monitor.

11. A data processing system according to claim 8, wherein:
the first software component comprises a first virtual machine (VM) to which the first ITAG has been assigned;
the destination software component comprises a second virtual machine (VM) to which the second ITAG has been assigned;
the processor further comprises a memory management unit (MMU) to translate a guest physical address (GPA) associated with the access request to a host physical address (HPA) that comprises the OTAG; and
the operation of comparing the OTAG associated with the memory address against the first ITAG for the first software component comprises comparing the first ITAG that has been assigned to the first VM against the OTAG in the HPA to verify whether the first VM owns a cache line that includes the HPA.

12. A data processing system according to claim 11, wherein the ZCM manager enables a virtual machine monitor to:
reserve a portion of machine memory as a machine ZCM region;
allocate a first host physical ZCM region for the first VM, wherein the first host physical ZCM region has a first OTAG;
allocate a second host physical ZCM region for the second VM, wherein the second host physical ZCM region has a second OTAG;
map a cache line from the machine ZCM region to the first host physical ZCM region if the HPA comprises the first OTAG; and map the cache line from the machine ZCM region to the second host physical ZCM region if the HPA comprises the second OTAG.

13. A data processing system according to claim 8, wherein the ZCM manager is further to:
in response to a receive request from a consumer software component that executes on the core, change the OTAG associated with the memory address to match an ITAG for the consumer software component.

14. A data processing system according to claim 13, wherein the ZCM manager is further to:
determine whether the OTAG associated with the memory address matches a specified ITAG for a source software component; and
abort the receive request without changing the OTAG associated with the memory address in response to a determination that the OTAG associated with the memory address does not match the specified ITAG for the source software component.

15. A non-transitory machine-readable medium comprising instructions which, when executed by a processor, cause the processor to:
in response to receiving an access request from a first software component, wherein the access request involves a memory address within a cache line:
(a) compare an owner tag (OTAG) associated with the memory address against a first identity tag (ITAG) for the first software component;
(b) if the OTAG matches the first ITAG, complete the access request, and
(c) if the OTAG does not match the first ITAG, abort the access request; and
in response to a send request from the first software component, wherein the send request specifies an ITAG for a destination software component, change the OTAG associated with the memory address to match the specified ITAG for the destination software component.

16. A non-transitory machine-readable medium according to claim 15, wherein the instructions, when executed by the processor, cause the processor to:
in response to a receive request from a consumer software component, change the OTAG associated with the memory address to match an ITAG for the consumer software component.

17. A non-transitory machine-readable medium according to claim 16, wherein the instructions, when executed by the processor, cause the processor to:
determine whether the OTAG associated with the memory address matches a specified ITAG for a source software component; and
abort the receive request without changing the OTAG associated with the memory address in response to a determination that the OTAG associated with the memory address does not match the specified ITAG for the source software component.

18. A non-transitory machine-readable medium according to claim 15, wherein:
the machine-readable medium comprises at least one virtual machine (VM) image to enable the processor to instantiate (a) a first VM to which the first ITAG is assigned and (b) a second VM to which the second ITAG is assigned;
the first VM comprises the first software component; and
the second VM comprises the destination software component.

19. A non-transitory machine-readable medium according to claim 18, wherein the send request enables the first VM to change the OTAG associated with the memory address to match the specified ITAG without calling a virtual machine monitor.

20. A non-transitory machine-readable medium according to claim 18, wherein:
the instructions, when executed, cause a memory management unit (MMU) in the processor to translate a guest physical address (GPA) associated with the access request to a host physical address (HPA) that comprises the OTAG; and
the operation of comparing the OTAG associated with the memory address against the first ITAG for the first software component comprises:
comparing the first ITAG that has been assigned to the first VM against the OTAG in the HPA to verify whether the first VM owns a cache line that includes the HPA.

21. A non-transitory machine-readable medium according to claim 18, wherein the instructions comprise a virtual machine monitor which, when executed by the processor, causes the processor to:
reserve a portion of machine memory as a machine zero-copy memory (ZCM) region;
allocate a first host physical ZCM region for the first VM, wherein the first host physical ZCM region has a first OTAG;
allocate a second host physical ZCM region for the second VM, wherein the second host physical ZCM region has a second OTAG;
map a cache line from the machine ZCM region to the first host physical ZCM region if the HPA comprises the first OTAG; and
map the cache line from the machine ZCM region to the second host physical ZCM region if the HPA comprises the second OTAG.

* * * * *